United States Patent
Kushner et al.

(10) Patent No.: US 10,482,365 B1
(45) Date of Patent: Nov. 19, 2019

(54) TRANSACTION INSTRUMENT CONTAINING METAL INCLUSIONS

(71) Applicant: Wells Fargo Bank, N.A., San Francisco, CA (US)

(72) Inventors: Kristine Ing Kushner, Orinda, CA (US); Paul Vittimberga, Oakland, CA (US); John Wright, Benicia, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 15/819,098

(22) Filed: Nov. 21, 2017

(51) Int. Cl.
*G06K 19/07* (2006.01)
*G06K 19/06* (2006.01)

(52) U.S. Cl.
CPC ... *G06K 19/0723* (2013.01); *G06K 19/06196* (2013.01)

(58) Field of Classification Search
CPC ............... G06K 19/0723; G06K 19/06196
See application file for complete search history.

(56) References Cited

U.S. PATENT DOCUMENTS

| | | | |
|---|---|---|---|
| 3,222,144 A * | 12/1965 | Davenport | B21D 26/08 228/107 |
| 3,516,933 A * | 6/1970 | Andrews | C08K 3/08 508/103 |
| 4,114,032 A | 9/1978 | Brosow et al. | |
| 4,906,494 A | 3/1990 | Babinec | |
| 5,106,288 A | 4/1992 | Hughes | |
| 5,120,589 A | 6/1992 | Morikawa et al. | |
| 5,134,773 A | 8/1992 | LeMaire et al. | |
| 5,236,637 A | 8/1993 | Hull | |
| 5,434,917 A | 7/1995 | Naccache et al. | |
| 5,602,381 A | 2/1997 | Hoshino et al. | |
| 5,714,747 A | 2/1998 | West et al. | |
| 6,104,311 A | 8/2000 | Lastinger | |
| 6,176,430 B1 | 1/2001 | Finkelstein et al. | |
| 6,221,296 B1 | 4/2001 | James et al. | |
| 6,364,982 B1 | 4/2002 | Lynch | |
| 6,471,128 B1 | 10/2002 | Corcoran et al. | |
| 6,894,624 B2 | 5/2005 | Kim et al. | |

(Continued)

FOREIGN PATENT DOCUMENTS

| | | |
|---|---|---|
| JP | H06103423 A | 4/1994 |
| KR | 20100000467 A | 1/2010 |

(Continued)

OTHER PUBLICATIONS

Article, Metal 3D Printing, http://gpiprototype.com/services/metal-3d-printing.html, June 9, 2015, pp. 1-3; all enclosed pages cited.

(Continued)

*Primary Examiner* — Seung H Lee
(74) *Attorney, Agent, or Firm* — Shumaker & Sieffert, P.A.

(57) ABSTRACT

A transaction instrument comprises a plastic and one or more metal inclusions embedded or encased in the plastic. The one or more metal inclusions are in a non-particle form and is selected from the group consisting of a bit, a piece, a strand, a strip, a mesh, a web, and a combination thereof. The metal inclusion is comprised of a metal selected from the group consisting of tungsten, silver, zinc, bismuth, molybdenum, iron, steel, tin, copper, titanium, or a combination thereof.

25 Claims, 8 Drawing Sheets

(56) References Cited

U.S. PATENT DOCUMENTS

| | | | |
|---|---|---|---|
| 6,930,606 B2 | 8/2005 | Crane et al. | |
| 7,240,847 B2 | 7/2007 | Püschner et al. | |
| 7,241,537 B2 | 7/2007 | Kaule | |
| 7,494,057 B2 | 2/2009 | Lasch et al. | |
| 7,733,231 B2 | 6/2010 | Carney et al. | |
| 7,785,680 B2 | 8/2010 | Brennan et al. | |
| 7,892,474 B2 | 2/2011 | Shkolnik et al. | |
| 8,121,386 B2 | 2/2012 | Rancien | |
| 8,171,567 B1* | 5/2012 | Fraser | G06T 1/0021 726/32 |
| 8,302,870 B2 | 11/2012 | Paeschke et al. | |
| 8,322,623 B1 | 12/2012 | Mullen et al. | |
| 8,383,329 B2 | 2/2013 | Matsuda et al. | |
| 8,523,062 B2 | 9/2013 | Varga et al. | |
| 8,857,722 B2* | 10/2014 | Mosteller | G06K 19/07722 235/488 |
| 9,016,591 B2 | 4/2015 | Herslow et al. | |
| 9,390,363 B1 | 7/2016 | Herslow et al. | |
| 2003/0131932 A1 | 7/2003 | Hoult et al. | |
| 2004/0254419 A1* | 12/2004 | Wang | A61K 45/06 600/8 |
| 2005/0035491 A1 | 2/2005 | Bagnall et al. | |
| 2005/0196604 A1 | 9/2005 | Funicelli et al. | |
| 2005/0211241 A1* | 9/2005 | Anderson | A61M 15/08 128/200.22 |
| 2005/0216075 A1* | 9/2005 | Wang | A61L 29/18 623/1.15 |
| 2005/0277231 A1 | 12/2005 | Hembree et al. | |
| 2006/0025560 A1* | 2/2006 | Inoue | C08G 63/06 528/272 |
| 2006/0074813 A1 | 4/2006 | Saunders | |
| 2006/0147742 A1 | 7/2006 | Matsuda et al. | |
| 2006/0219813 A1* | 10/2006 | Morrison | B05B 1/3442 239/334 |
| 2006/0249951 A1* | 11/2006 | Cruikshank | B42D 25/29 283/92 |
| 2006/0287715 A1* | 12/2006 | Atladottir | A61F 2/91 623/1.49 |
| 2007/0056585 A1* | 3/2007 | Davies | A61M 15/0065 128/203.15 |
| 2007/0138207 A1* | 6/2007 | Bonney | A61M 11/08 222/162 |
| 2008/0063462 A1 | 3/2008 | Steinschaden | |
| 2008/0265039 A1* | 10/2008 | Skowronek | G06K 19/07327 235/492 |
| 2009/0074231 A1 | 3/2009 | Rancien | |
| 2009/0184168 A1 | 7/2009 | Ricketts et al. | |
| 2010/0078489 A1 | 4/2010 | Winkler | |
| 2010/0096465 A1 | 4/2010 | Stagg | |
| 2010/0110514 A1* | 5/2010 | Houha | B29C 70/585 359/2 |
| 2010/0194093 A1 | 8/2010 | Macpherson | |
| 2010/0218760 A1* | 9/2010 | Anderson | A61M 15/009 128/200.23 |
| 2011/0031319 A1* | 2/2011 | Kiekhaefer | G06K 19/02 235/492 |
| 2011/0064388 A1 | 3/2011 | Brown et al. | |
| 2012/0055013 A1 | 3/2012 | Finn | |
| 2012/0125993 A1 | 5/2012 | Thiele et al. | |
| 2012/0153812 A1 | 6/2012 | Aurongzeb | |
| 2013/0116793 A1* | 5/2013 | Kloss | A61F 2/4455 623/17.16 |
| 2013/0256376 A1* | 10/2013 | Barton | A61B 17/07207 227/176.1 |
| 2013/0292862 A1 | 11/2013 | Joyce | |
| 2013/0295212 A1 | 11/2013 | Chen et al. | |
| 2013/0300101 A1 | 11/2013 | Wicker et al. | |
| 2013/0332353 A1 | 12/2013 | Aidasani et al. | |
| 2013/0334808 A1 | 12/2013 | Hazen et al. | |
| 2013/0335416 A1 | 12/2013 | Coon et al. | |
| 2014/0014715 A1 | 1/2014 | Moran et al. | |
| 2014/0037573 A1* | 2/2014 | Eliasof | A61K 31/713 424/78.29 |
| 2014/0051780 A1* | 2/2014 | Gross | C08G 63/06 521/182 |
| 2014/0076965 A1 | 3/2014 | Becorest et al. | |
| 2014/0117094 A1 | 5/2014 | Workley et al. | |
| 2014/0129354 A1 | 5/2014 | Soon-Shiong | |
| 2014/0137965 A1* | 5/2014 | Truitt | A41D 27/08 137/596 |
| 2014/0205637 A1* | 7/2014 | Widenhouse | A61B 17/07292 424/400 |
| 2014/0224857 A1* | 8/2014 | Schmid | A61B 17/0686 227/180.1 |
| 2014/0263664 A1* | 9/2014 | Branca, Jr. | G06K 19/0772 235/492 |
| 2014/0273961 A1 | 9/2014 | Narendra et al. | |
| 2014/0344091 A1 | 11/2014 | Krebs | |
| 2014/0367894 A1 | 12/2014 | Kramer et al. | |
| 2014/0367957 A1 | 12/2014 | Jordan | |
| 2015/0041546 A1 | 2/2015 | Herslow et al. | |
| 2015/0042755 A1 | 2/2015 | Wang | |
| 2015/0045934 A1 | 2/2015 | Kallenbach et al. | |
| 2015/0087427 A1 | 3/2015 | Wane | |
| 2015/0088290 A1 | 3/2015 | Ghosh | |
| 2015/0095213 A1 | 4/2015 | Paintin | |
| 2015/0097315 A1 | 4/2015 | DeSimone et al. | |
| 2015/0124314 A1* | 5/2015 | Konuma | B32B 27/30 359/361 |
| 2015/0182461 A1* | 7/2015 | Kim | A61K 9/5153 514/772.3 |
| 2015/0240388 A1* | 8/2015 | Joo | D04H 1/4382 252/74 |
| 2015/0266264 A1* | 9/2015 | Lowe | B32B 5/024 280/741 |
| 2015/0291854 A1* | 10/2015 | Colby | C09J 7/29 156/249 |
| 2016/0110639 A1* | 4/2016 | Finn | G06K 19/07788 235/439 |
| 2016/0156603 A1* | 6/2016 | Janik | H04L 63/0492 726/7 |
| 2016/0189154 A1* | 6/2016 | Eramian | G06Q 20/405 705/44 |
| 2017/0009108 A1* | 1/2017 | Mitchell | B32B 38/0004 |
| 2017/0032231 A1* | 2/2017 | Chapman | G06K 19/07318 |

FOREIGN PATENT DOCUMENTS

| | | |
|---|---|---|
| KR | 20160066300 A | 6/2016 |
| KR | 101653702 B1 | 9/2016 |
| WO | WO 2009/084774 A1 | 7/2009 |

OTHER PUBLICATIONS

Bourzac, Katherine; Ceramics That Won't Shatter; MIT Technology Review; Dec. 4, 2008; http://www.technologyreview.com/news/411301/ceramics-that-wont-shatter/page/2/; accessed on Nov. 20, 2014; all enclosed pages cited.

Huisman, J., Stevel, A.L.N, Stobbe, I.; Eco-efficiency considerations on the end-of-life of consumer electronic products; IEEE Transactions on Electronics Packaging Manufacturing, v 27, n 1, p. 9-25; Jan. 2004; all enclosed pages cited.

Launey, Maximilien E., Munch, Etienne, Alsem, Daan Hein, Saiz, Eduardo, Tomsia, Antoni P., and Ritchie, Robert O.; A novel biomimetic approach to the design of high-performance ceramic-metal composites; Journal of The Royal Society Interface; Oct. 14, 2009; pp. 741-753; published online; all enclosed pages cited.

Leaverusch, Robert D., Article, Now They Want Plastics To Be Heavy?, Plastics Technology, 5 pages, (June 2001); all enclosed pages cited.

Smart Card Technology, The Smart Card Report (Eighth Edition), pp. 269-287 (2004), only first page available online; full article available for purchase at http://www.sciencedirect.com/science/article/pii/B9781856174176500121.

Technical Overview of Biopolymer Field; https://www.princeton.edu/—ota/disk1/1993/9313/931304.PDF; accessed Aug. 18, 2016; all enclosed pages cited.

(56) References Cited

OTHER PUBLICATIONS

Waters, M., Cast vs. Calendered Vinyl, SIGNINDUSTRY.com, http://www.signindustry.com/vinyl/articles/2013-05-15-Avery-CastVsCalendered.php3, June 9, 2015, pp. 1-3; all enclosed pages cited.
Wikipedia, 3D printing, http://en.wikipedia.org/wiki/3D_printing, October 29, 2013, pp. 1-8; all enclosed pages cited.

* cited by examiner

TRANSACTION INSTRUMENT CONTAINING METAL INCLUSIONS

FIELD OF THE INVENTION

The present invention relates to a transaction instrument, more particularly to a transaction instrument comprised of a plastic with at least one metal inclusion.

BACKGROUND OF THE INVENTION

A vast number of financial transactions today involve a transaction or payment card such as a credit card, debit card, stored-value card or automated teller machine (ATM) card. Such cards are typically comprised of plastic. However, a growing number of consumers desire to have a transaction card that has a status element to it such as a weightier card. As a result, a number of card issuers have attempted to manufacture such cards. Some cards have been made of all metal.

However, there are a number of disadvantages associated with such cards including the elevated costs associated with manufacturing and machining such cards, and paying the manual labor costs associated with the manufacturing processes for such cards as well as difficulties in personalizing or embossing metal. Additionally, destruction and disposal of solid metal cards can be difficult, since they cannot be shredded, cut, or easily broken into pieces. Hence, there is a need to make an alternative card that satisfies these consumer needs and also can be manufactured in a more efficient and cost effective manner.

As noted above, payment cards are used every day for financial transactions throughout the world. The most common examples of payment cards are credit cards and debit cards. However, there are also disadvantages associated with the card shape. The traditional card is typically kept in a wallet, purse, or pocket. There are occasions when these methods of carrying may be inconvenient—for example, they may interfere with athletic activities, or may be prone to theft.

Hence, there is a need to make an alternative object that satisfies these consumer needs and also can be manufactured in a more efficient and cost effective manner.

SUMMARY OF THE INVENTION

The present invention relates to a transaction instrument and a method of making the transaction instrument.

In an embodiment of the invention, the transaction instrument comprises a combination of a plastic and a metal inclusion, preferably a plurality of metal inclusions. The metal inclusion is embedded or encased in the plastic, and the metal inclusion is in a form of a bit, piece, strand, strip, mesh, web, or combination thereof.

In an embodiment of the invention, the metal inclusion contains at least one heavy gravity metal component or metal.

In an embodiment of the invention, a method for making a transaction instrument comprises embedding or encasing a metal inclusion in plastic, and the metal inclusion is in a form of a bit, piece, strand, strip, mesh, web, or combination thereof.

In an embodiment of the invention, the transaction instrument is a card.

In an embodiment of the invention, the transaction card has a card body with a layer having an antenna and an area containing one or more metal inclusions surrounded by the antenna.

In an embodiment of the invention, the transaction instrument is in a form of a ring, wrist band, watch, pendant, fob, bracelet, charm, stylus, or other non-card form factor.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, which are not necessarily to scale, wherein.

DETAILED DESCRIPTION OF THE INVENTION

The following detailed description of the embodiment(s) is merely exemplary in nature and is in no way intended to limit the invention, its application, or uses.

Further, the term "or" as used in this disclosure and the appended claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provided illustrative examples for the terms. The meaning of "a," "an," and "the" may include plural references, and the meaning of "in" may include "in" and "on." The phrase "in one embodiment," as used herein does not necessarily refer to the same embodiment, although it may.

The present invention relates to a transaction instrument for use in a financial transaction such as making a purchase or other monetary transaction in commerce. Examples of transaction instruments include, but are not limited to, electronic devices in various forms, cards such as a credit card, debit card, automatic-teller machine (ATM) card, check card, stored-value cards, gift cards, among others. Transaction instruments may communicate with merchant terminals, automatic teller machines (ATM), and bank terminals, among others. Transaction instruments may be associated with various types of financial accounts such as a credit card account, debit card account, automatic-teller machine (ATM) account, direct deposit account, check, closed loop gift card account, open loop gift card account, or a combination thereof.

In accordance with an embodiment of the invention, a transaction instrument may take other various forms including, but not limited to, various electronic devices. Examples of such other electronic devices include, but are not limited to, non-traditionally credit-card shaped devices, including items worn on the body, dangling items, etc., formed, for example, into a fob, ring, watch, wrist band, bracelet, charm, other electronic jewelry, pen, pointer device, or stylus.

In accordance with the present invention, the transaction instrument comprises a plastic and a metal inclusion, preferably a plurality of metal inclusions. The metal inclusion is embedded or encased in the plastic. The metal inclusion is in a form of a bit, piece, strand, strip, mesh, web, or a combination thereof. The web may be in a decorative woven pattern, for example. The metal inclusion may be in a geometric shape or design. For example, the geometric shape or design could be a circle, star, diamond, corporate logo, or other image. The term "metal", as used herein, includes, but is not limited to, metallic elements, metal-containing compounds, other metal forms, or a combination thereof.

The metal inclusion has a thickness capable of being cut by a shredder or a card cutting die. The metal inclusion is greater in size than 10 microns. Preferably, the metal inclusion has a size on an order of magnitude greater than a micron such as in a range of millimeters. The metal inclusion is in non-particle form.

In an embodiment of the invention, the metal inclusion comprises or is comprised of a conductive metal with relatively low neurotoxicity (less bioactive than lead, mercury, cadmium, for example). Non-limiting examples of conductive metals include, but are not limited to, copper, iron, gold, platinum, and combinations thereof.

In an embodiment of the invention, the metal inclusion comprises or is comprised of a high-gravity or heavy-gravity metal component or material. High-gravity or heavy-gravity materials are generally classified according to specific gravity (SG) levels. Light has a typical specific gravity range of 1.7 to 4. Middle has a typical specific gravity range of 4 to 7. Heavy has a typical specific gravity range of 7 to 15.

High- or heavy-gravity metals or materials that may be particularly suitable for use in the present invention include, but are not limited to, tungsten, silver, zinc, bismuth, titanium, titanium dioxide, calcium carbonate, carbon, barium sulfate, steel, tin, nickel, copper, aluminum, or a combination thereof.

Materials that may be suitable for the plastic include, but are not limited to, polymers and co-polymers. Examples of such polymers and co-polymers that may be used alone or in combination are polypropylene (PP), nylon, polyvinyl chloride (PVC), polyvinyl chloride acetate (PVCA), oriented polyester, polybutylene terephthalate (PBT), thermoplastic polyurethane (TPU), poly(styrene-block-butadiene-block-styrene) (SBS) and hydrogenated versions thereof, polyphenylene sulfide (PPS), polyethylene, polyethylene terephthalate (PET), including biaxially-oriented polyethylene terephthalate, polyethylene terephthalate glycol (PET-G), polycarbonate, acrylonitrile butadiene styrene (ABS), polycarbonate, or a combination thereof.

Other polymers that may be suitable for use in the present invention include, but are not limited to, plant-based polymers and/or protein-based polymers. Examples of plant-based polymers that may be suitable for making the plastics include, but are not limited to, PLA, PLA-PGA, PHA, PHB, or a combination thereof. The plant based polymer can be a starch polymer, which could be combined with a resin for stability. The plant based polymer could also be cellulose including, but not limited to, carboxymethylcellulose combined with various plant based fibers. The polymer could also be a chitin and cellulose composite, with potentially favorable water repellant and strength properties. The polymer could also be chitosan, which has favorable ionic properties which could help it bind with metal particles.

The plastic may further comprise a plasticizer. The plastic may be optically transparent, in whole or in part. The optically transparent plastic may be opaque to some or all light outside of the visible spectrum. The optically transparent plastic may be opaque to ultraviolet light.

In an embodiment of the invention, the metal inclusion has a higher specific gravity than the plastic. The metal inclusion is preferably one of a plurality of metal inclusions in the plastic. The plurality of metal inclusions can be evenly distributed throughout the plastic.

Preferably, the plurality of metal inclusions comprise not less than 40% and not more than about 95% of total blended composite weight of the plastic and the metal inclusions, preferably greater than about 50% to not more than about 95%. Preferably, the plurality of metal inclusions has a volume comprising not less than 5% and not more than 60% of total blended composite volume of the plastic and the metal inclusions. The transaction instrument, when in the form of a card, preferably has a total weight of not less than 10 grams and not more than 30 grams.

Figure 1:
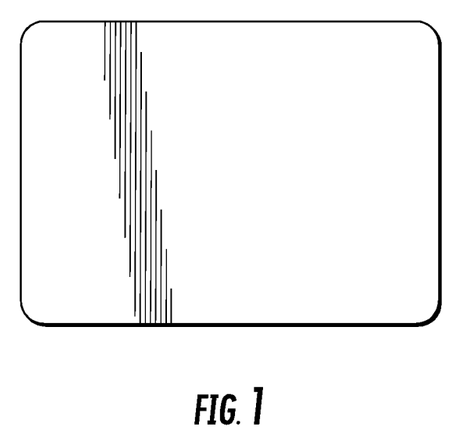
FIG. 1 illustrates a single layer transaction card in accordance with aspects of the present invention.

The transaction instrument of the present invention can be constructed in a number of configurations when in the form of a card. In one such configuration, the transaction card is a single-layer card comprised of a metal-filled plastic such as a high-gravity compound. FIG. 1 illustrates a single layer transaction card in accordance with aspects of the present invention. The single layer card is formed of the metal-filled plastic and typically has a thickness of about 30 mils. However, it is contemplated and within the scope of the present invention that the thickness may vary. The transaction card may be embossed, laser etched, or machined.

Figure 2:
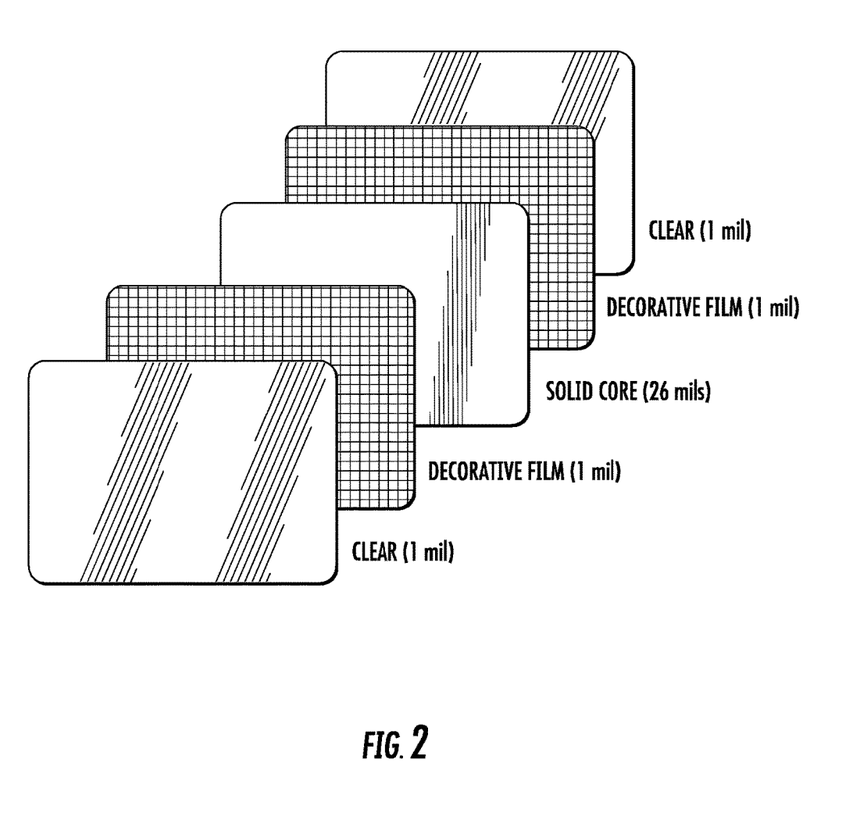
FIG. 2 illustrates a multi-layer transaction card in accordance with aspects of the present invention.

In another configuration, the transaction instrument of the present invention is a multi-layer card. FIG. 2 illustrates a multi-layer transaction card in accordance with aspects of the present invention. As shown in FIG. 2, the multi-layer card has a central core layer. The central core layer is comprised of a metal and plastic combination. The central core layer has a thickness of about 26 mils. A decorative film layer may be present on the front and back surfaces of the central core layer to sandwich the central core layer. The decorative film layer is about 1 mil in thickness. A clear layer(s) may be present on one or more of the decorative film layers, particularly on the side of the decorative layer that opposes the central core layer. A clear layer is typically about 1 mil in thickness. Paint may be applied to any surface of a decorative film layer.

Figure 3:
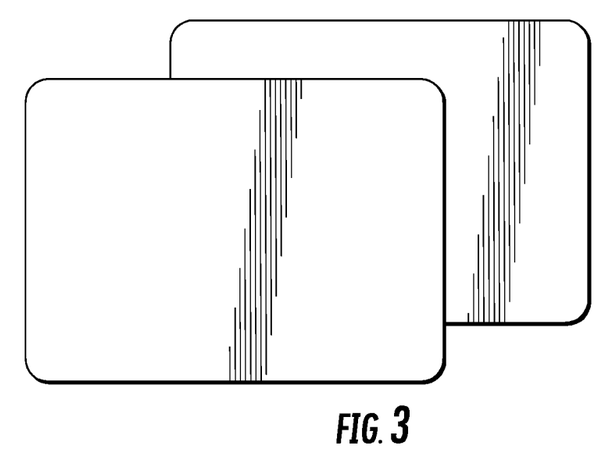
FIG. 3 illustrates a split core of a transaction card in accordance with aspects of the present invention.

In another possible configuration, the central core layer is a split core. FIG. 3 illustrates a split core of a transaction card in accordance with aspects of the present invention. As shown in FIG. 3, the central core layer is split into two layers as opposed to one. For example, each layer is about 12 to 15 mils. Among the advantages of the split core is easier processing. For example, it is easier to print on the front and back of each of the two layers and then laminate the layers back to front rather than printing on both sides of a single layer. In accordance with the present invention, one or more layers of the split core comprises a metal and plastic combination.

The metal and plastic combination layer(s) of the transaction instrument of the present invention can be made by a number of methods of manufacture. In a preferred aspect of the present invention, the transaction instrument is made by lamination of layers with one or more layers comprising a metal and plastic combination. In a preferred aspect of the present invention, the metal and plastic combination is a high-gravity compound. A layer may comprise in whole or in part of a metal and plastic combination and, in the case of a single layer, may be the entire thickness of the instrument.

Figure 4:
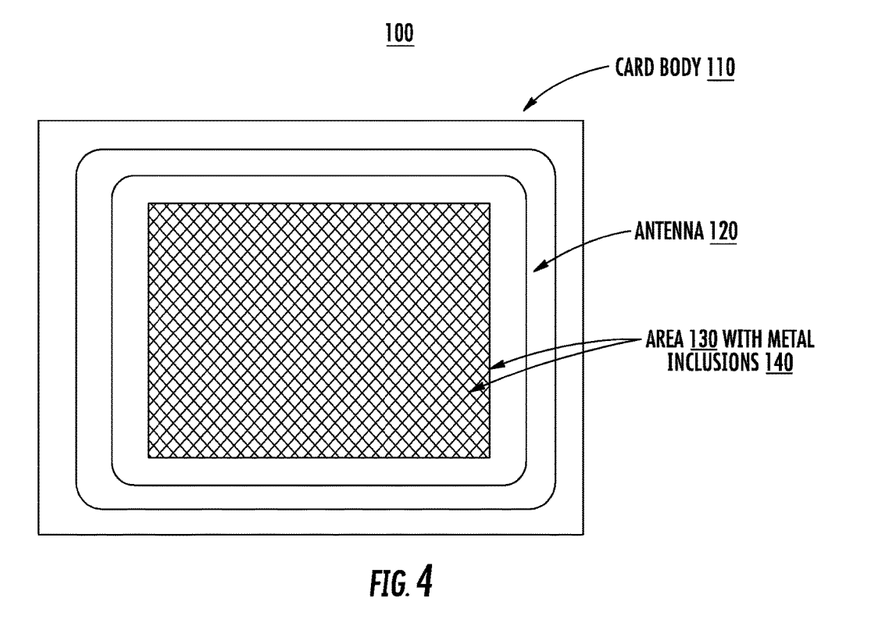
FIG. 4 illustrates a layer of a card body of a transaction instrument, with the layer having an antenna and an area containing one or more metal inclusions.

Referring to FIG. 4, FIG. 4 illustrates a plastic layer of a card body 110 of a transaction card 100, with plastic layer 110 comprising an antenna 120 and an area 130 containing one or more metal inclusions 140. One or more metal inclusions 140 are embedded or encased in plastic layer 110. Antenna 120 surrounds area 130 containing one or more metal inclusions 140.

Among the methods of making a plastic layer include, but are not limited to, extrusion, calendaring, casting, blowing or blow molding, injection molding, and additive manufacturing.

Figure 5:
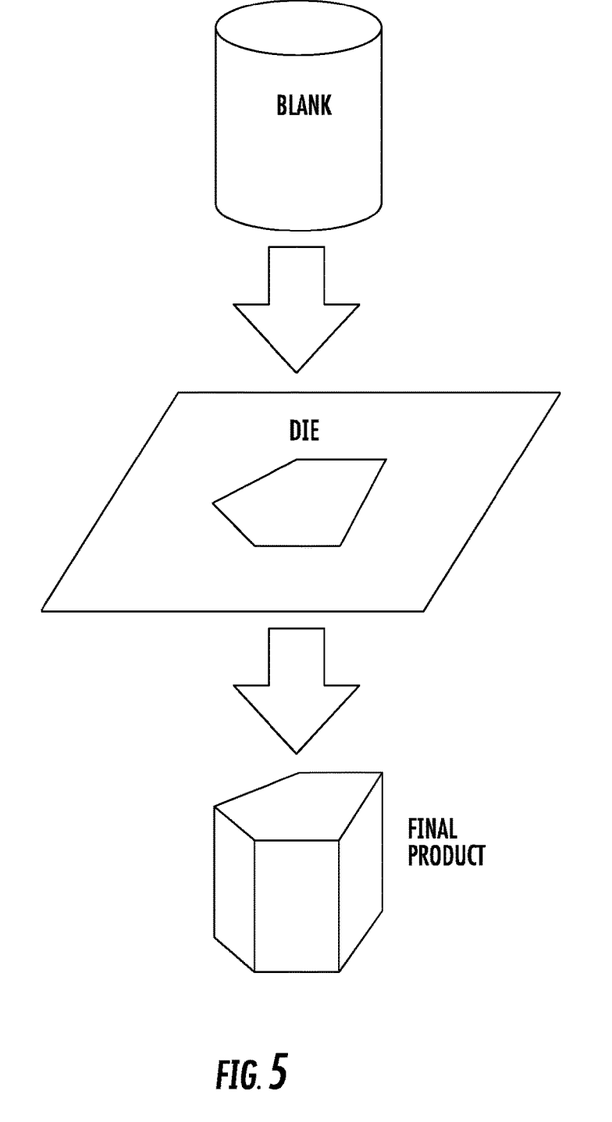
FIG. 5 illustrates an extrusion process.

One such process is extrusion. An example of a method of making a transaction instrument of the present invention by an extrusion process is shown in FIG. 5. An extruded film layer can be formed by an extrusion process. Extrusion is a process whereby a plastic material is inserted or forced through a die having a particular shape. This process can be used to create one or more plastic layers.

Figure 6:
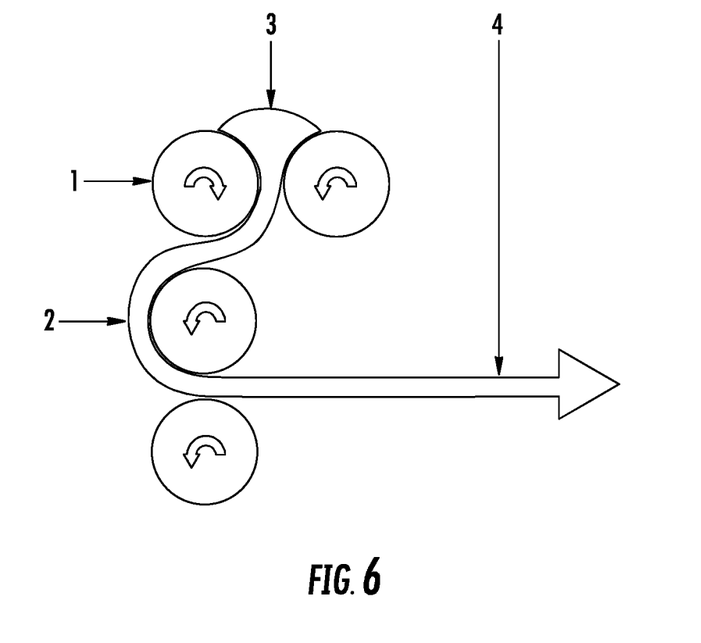
FIG. 6 illustrates a calendaring process.

Another process that may be used to make the transaction instrument of the present invention is calendaring. An example of a method of making a transaction instrument of the present invention by a calendaring process is shown in FIG. 6. Calendaring is used to make a calendared film. A calendar is a series of hard pressure rollers used to form or smooth a sheet of material such as paper or plastic film. The process begins with the ingredients 3 being mixed, heated and then extruded through a pair of counter-rotating rollers 1. Additional rollers can be used to further shape or thin the sheet 2. An embossing station can impart different patterns or levels of gloss to the extruded material. Finally, the film 4 is cooled before being cut into sheets if more rigid, or spooled onto rolls if sufficiently flexible. The material used for the transaction instrument is relatively rigid and would most likely be cut into sheets.

Another method of making the transaction instrument of the present invention is casting. Casting produces cast film. The process begins with the ingredients being mixed and then extruded onto a moving web known as the casting sheet. Ingredients are likely to be liquid or more melted than those at the start of a calendaring process. Unlike calendaring, the material is not itself pulled through rollers, and any dimensional stress is borne by the casting sheet. Since the film has not had any stress applied during the manufacturing process it does not try to resume or shrink back to its original form. Casting may provide an advantage over calendared films which generally shrink a minimum of 2-3% over time. Casting allows the film to be very thin and while it is possible to make a 2 mil sheet either calendaring or casting, there may be greater uniformity and ease of manufacturing with casting.

In another aspect of the method of making the transaction instrument of the present invention, the transaction instrument manufacturing process may employ extrusion. Extruded, calendared, or cast film can employ extrusion, which is the simultaneous production of two or more materials to form a multi-layered film. Co-extrusion can include the manufacturing of different types of layers with different properties. For example, the heavy core of the instrument can be sandwiched between colorful surface layers or clear protection.

Another method of making the transaction instrument of the present invention is injection molding. Injection molding may be stand-alone or around components. Components around which injection molding may occur include, but are not limited to, a chip such as an ME chip, a contactless antenna, a magnetic strip or other components.

Another method of making the transaction instrument of the present invention is additive manufacturing. A thin metal mesh may lend itself to additive manufacturing or continuous liquid interface (CLIP) methods by providing a frame on which to build additional plastic.

The transaction instrument of the present invention has special features. One such feature is a split core as illustrated in FIG. 3. A core of an instrument that is not split must be turned over to be printed and finished on the other side as part of the instrument or card manufacturing process. This is less efficient. Furthermore, by making two heavy plastic core halves that can be processed separately and then laminated together, the cost in the manufacturing process is reduced. Waste can also be reduced since turning over a single core leads to higher damage and defective product that is discarded.

Figure 7:
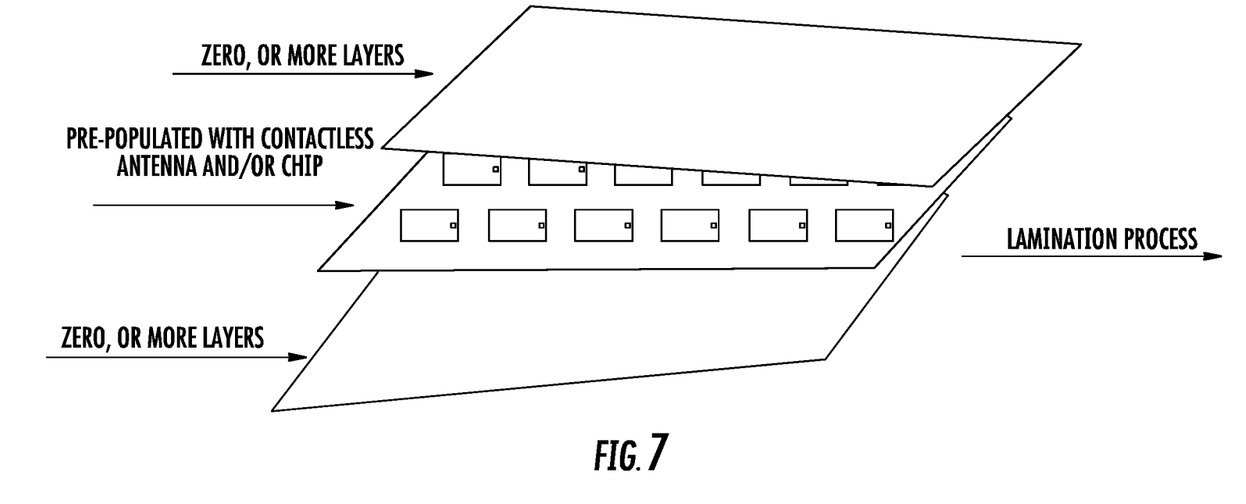
FIG. 7 illustrates an in-line lamination process.

In still another aspect of the method of making the transaction instrument of the present invention, the manufacturing process may employ in-line lamination. An example of a method of making the transaction instrument of the present invention by in-line manufacturing is shown in FIG. 7. Similar to co-extrusion, an extruded, calendared, or cast film can be laminated in-line with finished layers such as foils, decorative printed sheets, or protective layers. In-line lamination may also include sheets containing contactless antenna and chip packages.

In another embodiment of the invention, the transaction instrument may be made by three-dimensional (3D) or additive manufacturing.

Thus, there are a number of advantages associated with the plastic-and-metal-combination transaction instruments of the present invention and method of making such instruments. Among the advantages is that metal and plastic combination instruments offer superior weight. They also provide manufacturing cost advantages as compared to metal cards which have high machining and manual labor costs. They also may be personalized through embossing, unlike a more rigid metal card. Furthermore, they are easier and/or more cost effective to destroy than more rigid metal cards.

It is contemplated and within the scope of the present invention that the transaction cards of the present invention can be used for other applications beyond mere financial transactions. For example, the transaction cards of the present invention may be used as include loyalty/affinity cards as well as items like security badges.

There are numerous features associated with the transaction card of the present invention. For example, the transaction card may comprise a chip such as an EMV chip, a recess for an antenna and/or wires, and a magnetic strip, among other features. The transaction card may have varying colors, logos and images and decorative features such as inlaid decoration, various textures, personalization, and braille. Likewise, the transaction card may vary in shape, size or orientation.

As a feature of the invention, the transaction card comprises a recess. The recess may comprise a component or inset device. The inset device may comprise one or more conducting contact pads. The contact pads are preferably located as set forth in ISO 7816. Examples of one or more components or inset devices include, but are not limited to, a chip such as a Europay-Mastercard-Visa (EMV) chip, a contactless antenna, a contactless antenna chip, a magnetic strip, an in-laid decoration, embedded features, and printed features. The recess has a size and a shape to accommodate the component or inset device. Preferably, the recess has a depth in a range of 15 mils to 25 mils at the deepest point.

There are numerous advantages associated with the transaction instrument of the present invention. The presence of the metal inclusions in lieu of the plastic enhances the tactile properties of the transaction instrument as well as enables convenient destruction. In an embodiment of the invention, the metal inclusion is at or near an outer surface of the transaction instrument. Embedded metal inclusions, if near the surface of the card, may create additional tactile appeal by creating texture. For example, strands may create a striated feel, etc. Additionally, embedded metal inclusions may not only improve tactile properties, but may also constitute a security element. In another embodiment of the invention, the metal inclusion comprises a security feature. For example, the metal inclusions may take on shapes that respond to electromagnetic signals or they may be elements that can be seen and/or detected through plastic. For example, the metal inclusions may include printing, etching, holograms, etc. on the metal. Additionally, introduction of metal elements, in sufficient quantity, will allow ATMs and other readers to detect cards even if the plastic component of the card is transparent to the detector (infrared, etc).

In an embodiment of the invention, a method is provided for making a transaction instrument in a form of a three-dimensional object of any shape, also referred to herein as a form factor. A customer or user may wish to have a non-traditionally credit-card shaped device, including, but not limited to, an item to be worn on the body and/or dangling items. In an embodiment of the invention, a method is provided for making a non-credit-card shaped device. The order of the steps may vary. The method generally comprises obtaining a plastic, forming the plastic into a shape, incorporating one or more metal inclusions within the plastic. Alternatively, the method generally comprises obtaining a plastic, incorporating one or more metal inclusions within the plastic, and forming the plastic with one or more metal inclusions therein into a shape for a device. Non-limiting examples of such devices include, but are not limited to, a fob, ring, watch, wrist band, bracelet, charm, other jewelry, pen, pointer device, and stylus.

These objects, especially if worn on the user's person, may have more appeal if they are tactilely pleasing. A plastic object with embedded metal bits, for example, would have the tactile appeal of weight as well as potential cost savings over pure metal in manufacture. If the metal elements were fully enclosed, they would be protected from the elements and would not rust, corrode, etc. The metal elements also create tactile appeal by creating texture on the surface of the object, if they are near the surface.

A form factor has a shaped body and may comprise in a portion of or throughout the shaped body an area comprising a material and one or more metal inclusions. The one or more metal inclusions are present in or distributed throughout the material, preferably in an electrically isolated pattern. An antennae may surround the material having one or more metal inclusions embedded therein. Preferably, the shaped body may be formed by injection molding, 3D printing, additive manufacturing, or any other customary manufacturing method. The form factor may have a recess for a component or inset device. Preferably, the shaped body is in a shape conducive to resonance for Near Field Communication (NFC) and/or is electrically connected to an integrated circuit (IC) unit.

The shaped body can be in a form of a ring, bangle or other jewelry, charm, fob, or card with an optional mesh loop(s) acting as an antenna, conductively connected to an IC, comprising an EMV chip and/or transaction instrument.

In an embodiment of the invention, a transaction instrument comprises a plastic, one or more metal inclusions embedded or encased in the plastic, the metal inclusions comprised of a metal selected from the group consisting of tungsten, silver, zinc, bismuth, molybdenum, iron, steel, tin, copper, titanium, and a combination thereof, and an antenna surrounding the one or more metal inclusions, wherein the one or more metal inclusions are in a non-particle form selected from the group consisting of a bit, a piece, a strand, a strip, a mesh, a web, and a combination thereof, and wherein the transaction instrument is in a form of a torus or a circle and the antenna is embedded concentrically within the torus or circle.

Figure 8A:
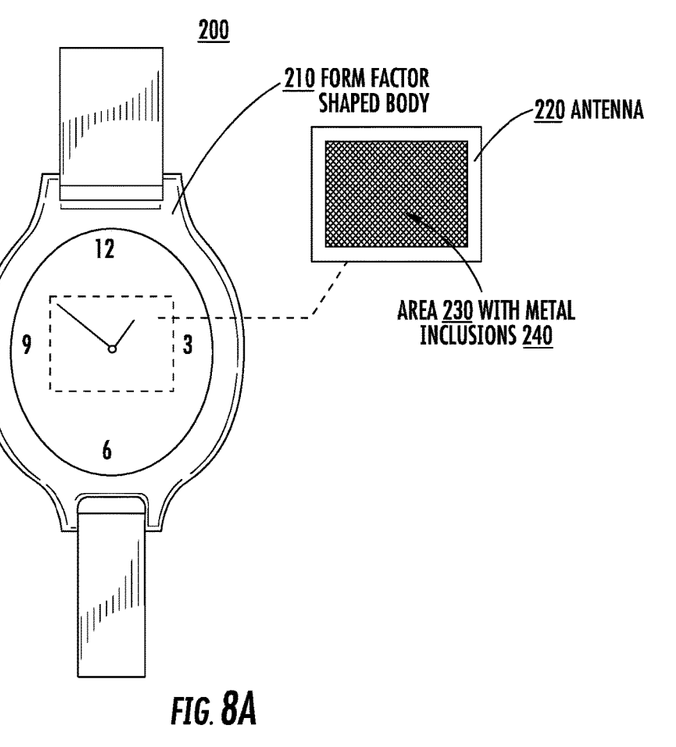
FIG. 8A illustrates a non-card form factor having a shaped body in a form of a watch.

FIG. 8A illustrates a non-card form factor 200 having a shaped body formed of a material in a form of a watch. As shown in FIG. 8A, form factor shaped body 210 is in a form of a watch. Form factor shaped body 210 comprises an antenna 220 surrounding an area 230 with metal inclusions 240.

Figure 8B:
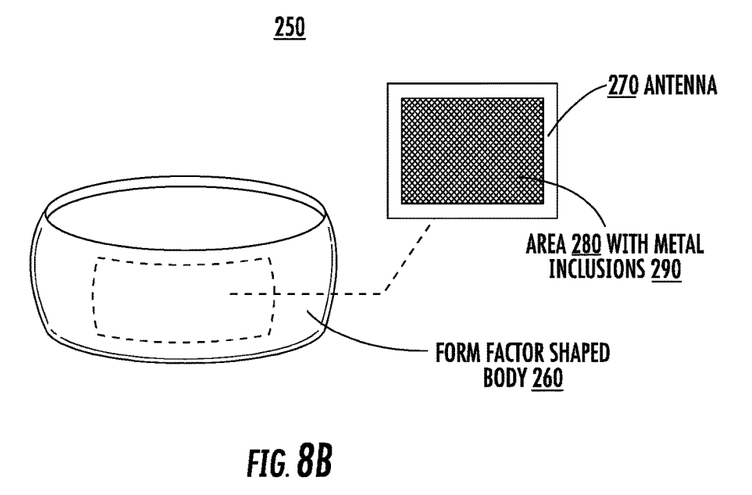
FIG. 8B illustrates a non-card form factor having a shaped body in a form of a bangle or a ring.

FIG. 8B illustrates a non-card form factor 250 having a shaped body formed of a material in a form of a bangle or a ring. As shown in FIG. 8B, form factor shaped body 260 is in a form of a bangle or ring. Form factor shaped body 260 comprises an antenna 270 surrounding an area 280 with metal inclusions 290.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

What is claimed is:

1. A transaction instrument comprising:
   a plastic, and
   a metal inclusion embedded or encased in the plastic,
   wherein the metal inclusion is in a non-particle form and is selected from the group consisting of a bit, a piece, a strand, a strip, a mesh, a web, and a combination thereof,
   wherein the transaction instrument is associated with a financial account and includes at least one financial transaction component, wherein the at least one financial transaction component comprises one or more of a Europay-Mastercard-Visa (EMV) chip or a contactless antenna chip including data representing the financial account, and wherein the metal inclusion responds to an electromagnetic signal received from an external computing device to read the data representing the financial account from the at least one financial transaction component.

2. The transaction instrument of claim 1, wherein the metal inclusion is in a geometric shape or design.

3. The transaction instrument of claim 1, wherein the metal inclusion has a thickness capable of being cut by a shredder or a card cutting die.

4. The transaction instrument of claim 1, wherein the wherein the metal inclusion has a size on an order of magnitude greater than a micron.

5. The transaction instrument of claim 1, wherein the metal inclusion is greater in size than 10 microns.

6. The transaction instrument of claim 1, wherein the metal inclusion has a size in a range of millimeters.

7. The transaction instrument of claim 1, wherein the transaction instrument comprises a card body having at least one layer of plastic having the metal inclusion embedded or encased in the plastic.

8. The transaction instrument of claim 1, wherein the metal inclusion is at or near an outer surface of the transaction instrument.

9. The transaction instrument of claim 1, wherein the metal inclusion comprises a security feature.

10. The transaction instrument of claim 1, wherein the metal inclusion has a shape or is in a pattern that responds to the electromagnetic signal.

11. The transaction instrument of claim 1, wherein the metal inclusion has a higher specific gravity than the plastic.

12. The transaction instrument of claim 1, wherein the metal inclusion is one of a plurality of metal inclusions in the plastic.

13. The transaction instrument of claim 12, wherein the plurality of metal inclusions are evenly distributed throughout the plastic.

14. The transaction instrument of claim 12, wherein the plurality of metal inclusions comprise not less than 40% and not more than 95% of total blended composite weight of the plastic and the metal inclusions.

15. The transaction instrument of claim 12, wherein the plurality of metal inclusions has a volume comprising not less than 5% and not more than 60% of total blended composite volume of the plastic and the metal inclusions.

16. The transaction instrument of claim 1, wherein the transaction instrument is in a form of a card having a total weight of not less than 10 grams and not more than 30 grams.

17. The transaction instrument of claim 1, wherein the metal inclusion comprises or is comprised of a conductive metal with a relatively low neurotoxicity as compared to lead, mercury, or cadmium.

18. The transaction instrument of claim 1, wherein the metal inclusion is comprised of a metal or a metal-containing component selected from the group consisting of tungsten, silver, zinc, bismuth, molybdenum, iron, steel, tin, copper, titanium, titanium dioxide, calcium carbonate, barium sulfate, nickel, aluminum, and a combination thereof.

19. The transaction instrument of claim 1, wherein the plastic is selected from a group consisting of polyvinyl chloride (PVC), polyvinyl chloride acetate (PVCA), oriented polyester, polyethylene terephthalate, biaxially-oriented polyethylene terephthalate, polycarbonate, polylactic acid (PLA), polylactic acid-polyglycolic acid (PLA-PGA), polyhydroxyalkanoate (PHA), polyhydroxybutyrate (PHB), starch, cellulose, carboxymethylcellulose, chitin, chitin and cellulose composite, chitosan, protein based bioceramic, and a combination thereof.

20. The transaction instrument of claim 1, wherein the plastic is optically transparent, in whole or in part.

21. The transaction instrument of claim 20, wherein the optically transparent plastic is opaque to some or all light outside of the visible spectrum.

22. The transaction instrument of claim 20, wherein the optically transparent plastic is opaque to ultraviolet light.

23. The transaction instrument of claim 1, where the transaction instrument is in a form selected from the group consisting of a fob, ring, watch, wrist band, bracelet, charm, other jewelry, pen, pointer device, stylus, and a combination thereof.

24. A transaction card having a card body with one or more layers, the transaction card comprising:
a plastic layer of the card body,
an area containing one or more metal inclusions embedded or encased in the plastic layer, and
an antenna surrounding the area containing the one or more metal inclusions,
wherein the metal inclusion is in a non-particle form selected from the group consisting of a bit, a piece, a strand, a strip, a mesh, a web, and a combination thereof,
wherein the metal inclusion is comprised of a metal selected from the group consisting of tungsten, silver, zinc, bismuth, molybdenum, iron, steel, tin, copper, titanium, and a combination thereof,
wherein the transaction instrument is associated with a financial account and includes at least one financial transaction component, wherein the at least one financial transaction component comprises one or more of a Europay-Mastercard-Visa (EMV) chip or a contactless antenna chip including data representing the financial account, and
wherein the metal inclusion responds to an electromagnetic signal received from an external computing device to read the data representing the financial account from the at least one financial transaction component via the antenna.

25. A transaction instrument comprising:
a plastic,
one or more metal inclusions embedded or encased in the plastic, the metal inclusions comprised of a metal selected from the group consisting of tungsten, silver, zinc, bismuth, molybdenum, iron, steel, tin, copper, titanium, and a combination thereof, and
an antenna surrounding the one or more metal inclusions,
wherein the one or more metal inclusions are in a non-particle form selected from the group consisting of a bit, a piece, a strand, a strip, a mesh, a web, and a combination thereof,
wherein the transaction instrument is in a form of a torus or a circle and the antenna is embedded concentrically within the torus or circle,
wherein the transaction instrument is associated with a financial account and includes at least one financial transaction component, wherein the at least one financial transaction component comprises one or more of a Europay-Mastercard-Visa (EMV) chip or a contactless antenna chip including data representing the financial account, and wherein the metal inclusion responds to an electromagnetic signal received from an external computing device to read the data representing the financial account from the at least one financial transaction component via the antenna.

* * * * *